United States Patent [19]

Sandercock

[11] Patent Number: 4,643,385

[45] Date of Patent: Feb. 17, 1987

[54] ANTI-VIBRATION SYSTEM

[75] Inventor: John R. Sandercock, Affoltern, Switzerland

[73] Assignee: RCA Corporation, Princeton, N.J.

[21] Appl. No.: 671,917

[22] Filed: Nov. 15, 1984

[51] Int. Cl.⁴ .............................................. F16M 13/00
[52] U.S. Cl. .................... 248/550; 248/638; 248/562; 248/636; 267/140.1
[58] Field of Search ............... 248/550, 636, 638, 562, 248/559, 556, 560, 603, 618; 267/140.1, 141; 188/379, 380

[56] References Cited

U.S. PATENT DOCUMENTS

| | | | |
|---|---|---|---|
| 2,924,420 | 2/1960 | Fink | 248/562 |
| 3,276,762 | 10/1966 | Thomas | 248/627 |
| 3,464,657 | 9/1969 | Bullard | 248/20 |
| 3,592,422 | 7/1971 | Paine | 248/604 |
| 3,784,146 | 1/1974 | Mathews | 248/562 |
| 3,952,979 | 4/1976 | Hansen | 248/20 |
| 4,033,541 | 7/1977 | Malueg | 248/358 |
| 4,336,917 | 6/1982 | Phillips | 248/550 |
| 4,531,699 | 7/1985 | Pinson | 248/550 |

FOREIGN PATENT DOCUMENTS

| | | | |
|---|---|---|---|
| 135800 | 4/1985 | European Pat. Off. | 248/614 |
| 103045 | 6/1984 | Japan | 248/636 |
| 571642 | 9/1977 | U.S.S.R. | 248/550 |
| 581345 | 11/1977 | U.S.S.R. | 248/550 |

*Primary Examiner*—Reinaldo P. Machado
*Assistant Examiner*—Alvin Chin-Shue
*Attorney, Agent, or Firm*—Joseph S. Tripoli

[57] ABSTRACT

An object to be isolated from vibrations is supported by a structure having a curved surface which contacts the object. The support structure is in turn coupled to a resilient spring-like support frame which allows the structure to move in response to vibrations. Also contacting the support structure are three isolation elements which sense the vibration forces and produce forces to counter the vibrations.

10 Claims, 6 Drawing Figures

ANTI-VIBRATION SYSTEM

The present invention relates to devices for reducing or canceling the effects of vibrations on an object.

BACKGROUND OF THE INVENTION

Certain delicate machines and instruments can be rather sensitive to external vibrations. Generally there are two distinct effects—(1) high frequency vibrations which tend to excite a mechanical resonance in some part of the machine or its supports, and (2) low frequency vibrations tending to produce a non-resonant distortion of the machine's basic structure. Normally the former effect, at frequencies typically in the range of 100–1,000 Hz., can be effectively eliminated by the simple expedient of mounting the system on thin rubber pads. The latter effect, typically driven by building vibrations in the frequency range of 2–25 Hz, is much harder to eliminate and some sophisticated passive antivibration mounts have been developed for this purpose. It is these low frequency vibrations to which the present invention is directed.

The simplest method of vibration isolation consists of mounting the device to be isolated (or its platform) on a spring having a force constant $\lambda$. To increase the energy absorption of a passive system, damping and compound spring devices have been employed. Although such passive systems can accomplish a great deal, some displacement of the device or platform results.

To overcome some of the shortcomings of a passive system various dynamic antivibration systems have been developed. Generically these systems detect the vibration and produce counter forces to cancel the forces driving the vibration. Such dynamic systems have been used to eliminate particular structural resonances (i.e. relatively high frequencies—the resonant condition referred to above). In such systems the correction forces have been derived using electric solenoids or compressed gas transducers.

SUMMARY OF THE INVENTION

A dynamic anti-vibration system for reducing the effects of vibrations on an object is built around a support structure having a curved surface for supporting the object. The support structure is coupled to a resilient support means. The support structure is also partially supported by three devices for reducing the effects of the vibrations. Each of these devices includes a force sensor and a means for producing forces which counter the vibration forces.

DETAILED DESCRIPTION OF THE PREFERRED EMBODIMENTS

Figure 1:
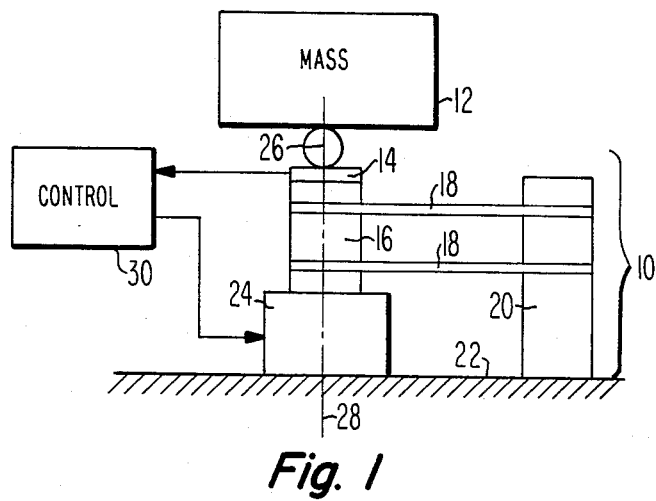
FIG. 1 is a schematic side view of a vibration isolation element according to the present invention.

With initial reference to FIG. 1, a schematic representation of one isolation element 10 is shown supporting the mass of object 12 to be isolated. The isolation element 10 consists of a piezoelectric transducer element 14 resting on a support cylinder 16. The object 12 rests on a sphere 26 which is on the isolation element's piezoelectric transducer 14. The piezoelectric transducer 14 upon which the object 12 sits acts as an accelerometer which senses the vibrations of the object. The support cylinder 16 is coupled by two thin parallel steel straps 18 to a support post 20. The support straps 18 form a deformable parallelogram which has an effective spring constant $\lambda$. The support structure 20 rests on either the floor 22 or a base plate. The support column 16 rests on a transducer 24 which is on the floor 22. The transducer 24 generates forces to counter the vibrations.

Sphere 26 functions to isolate the forces which are transmitted from the object 12 to the piezoelectric transducer to only those force vectors parallel to the longitudinal axis 28 of the support cylinder 16. Since the mass of the object is supported by the vibration sensing transducer 14, vertical acceleration in the object 12 is produced by a change in the force through the transducer 14. This force produces a voltage across the piezoelectric device which is representative of the vibration forces acting on the object 12. The resulting voltage is integrated in a control circuit 30 to produce a current which is proportional to the absolute velocity of the object 12 along axis 28. This current is used to drive the transducer 24 which sets up counter-vibration forces in the support structure 10. These counter-vibration forces effectively reduce or cancel the original vibrations in object 12.

For lightweight objects 12, a loudspeaker having its coil driven by the output current from control 30 can be used as the transducer 24. Alternatively, the current from the control 30 could be employed to activate other types of anti-vibration force generators such as a solenoid or even a hydraulic or pneumatic piston in place of the loudspeaker coil 24 in cases where the mass of the object 12 was sufficiently large that a loud speaker coil would be impractical.

The apparatus shown in FIG. 1 is purely schematic and additional anti-vibration devices 10 would have to be provided in order to support the object 12 from beneath it. Additional anti-vibration devices could be employed to provide vibration damping in all three axes. This latter approach would require devices 10 to be located in both the horizontal, as well as the vertical planes.

Figure 2:
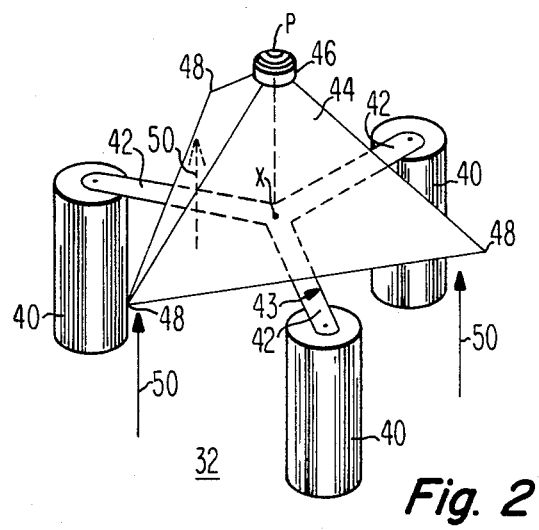
FIG. 2 is one of the dynamic anti-vibration systems used to provide three-dimensional vibration reduction.

Alternatively, vibration isolation in three axes can be provided by supporting the object 12 from below utilizing three novel support structures, one of which is shown in FIG. 2. The support structure 32 includes three fixed supports 40 arranged at the corners of an equalateral triangle. Attached to each of the fixed supports 40 and extending therefrom is a thin steel strap, which is connected to the other straps at a central point X. The straps 42 form a support frame 43 which is sufficiently resilient to provide a spring-like effect for any mass supported over point X. A mass support 44, such as a tetrahedron, is positioned centrally over the support frame 43 so that the apex 46 of the tetrahedron is directly over the central point X. Each of the other vertices 48 of the tetrahedron is positioned essentially midway between adjacent fixed supports 40. The apex 46 of the tetrahedron support structure 44 has a spherical shape with a radius of curvature centered at point X. The object to be supported is placed on support 44 at point P on the surface of the spherical apex 46.

Each of the remaining three vertices 48 of the tetrahedron is supported by an isolation element similar to element 10 shown in FIG. 1 and schematically represented for simplicity in FIG. 2 by three arrows 50.

Figure 3:
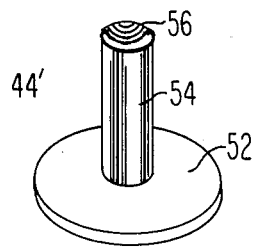
FIG. 3 is an alternate embodiment of one element of the system of FIG. 2.

Alternatively as is shown in FIG. 3, the tetrahedron could be replaced by a support structure 44' formed by a disk 52 having a cylindrical support pillar 54 extending upwardly from the center of the disk. The remote end 56 of the support cylinder 54 has a spherical shape similar to that at the apex 46 of the tetrahedron in FIG. 2. The support structure in FIG. 3 may be the preferred embodiment due to its easier manufacturablity.

Typically three or more support structures 32 depending on the weight to be supported would be used to provide vibration reduction for an object or a platform. The structures 32 are placed beneath the object and provide vibration isolation in all three axes, not just in the vertical axis.

The mass support 44 may move in the vertical direction as well as rotate about any horizontal axis through point X. A vertical acceleration of the supported mass produces a vertical displacement of the support 44 and will be detected equally by all three isolation elements 50. On the other hand a horizontal acceleration results in a tilting of the mass support 44 with corresponding out of phase accelerations in the three isolation elements 50. These out of phase accelerations produce different forces in the counter force transducers 24 of each isolation element 50. The unequal vibration countering forces oppose and therefore cancel the horizontal vibrations. During a tilt of the support structure 44, the object support point P will change in location on the spherical surface of apex 46 but will remain substantially vertically above central point X. The distribution of the weight of the supported mass over the three isolation elements 50 therefore remains constant. This is very important for correct operation of the device.

Figure 4:
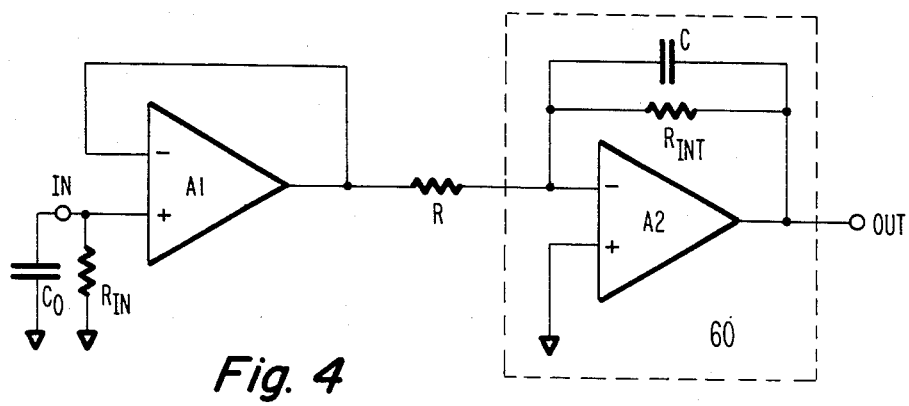
FIGS. 4, 5, and 6 are schematic electrical diagrams of the control circuitry for the anti-vibration system according to the present invention.

The control circuit 30 in its simplest form is shown in FIG. 4. As the piezoelectric transducer 14 is a pure capacitance at the low vibration frequencies considered here, it is represented by capacitance $C_o$. One terminal of the sensing transducer 14 is connected to ground and the other is connected to the non-inverting input of a first amplifier A1. The non-inverting input of amplifier A1 is also connected to ground through an input resistor $R_{in}$. The resistance $R_{in}$ to ground is necessary to define the DC conditions of the first amplifier. The time constant $C_o R_{in}$ defines the vibration frequency response of the control circuit. The output of the amplifier A1 is connected back to its inverting input so as to provide a feedback path.

The output of amplifier A1 is also coupled through resistor R to an integrator 60. Specifically the output from amplifier A1 is fed to the inverting input of a second amplifier A2 of the integrator. The second amplifier A2 is provided with a feedback circuit consisting of a capacitance C and a resistor $R_{int}$ connected in parallel between the output of the second amplifier A2 and its inverting input. The non-inverting input of the second amplifier is connected to ground. The feedback resistance $R_{int}$ in the integrator also helps to define the DC conditions of the control circuit 30. In order that the vibration isolation device will operate down to frequencies of 1 Hz or less, it is necessary that both the time constants $C_o R_{in}$ and $CR_{int}$ be set much longer than one second.

The control circuit as embodied in FIG. 4 utilizes the first amplfier A1 as a voltage follower thereby amplifying the voltage developed across the piezoelectric transducer 14. This voltage is then integrated by the second amplifier A2 and its feedback circuit to provide a current output proportional to the absolute velocity of the supported object. This current then drives the vibration countering transducer 24.

Figure 5:
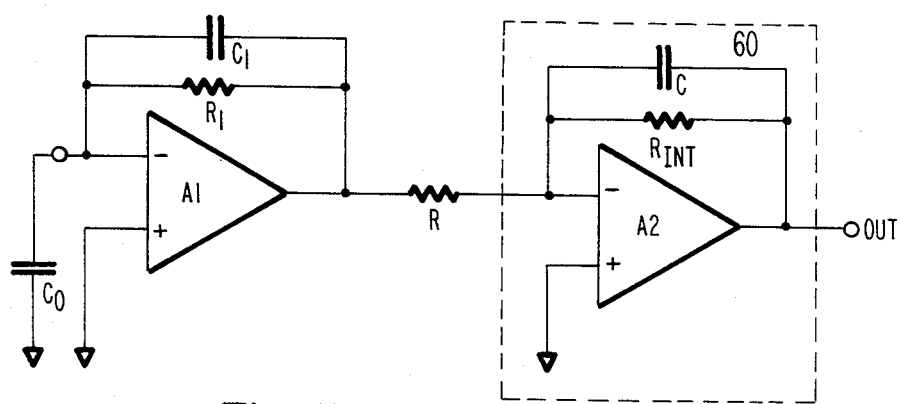

In the discussion so far it has been assumed that the output from the piezoelectric transducer is a voltage proportional to the force change—in fact, since the transducer is a capacitance, the charge developed in the transducer may be measured instead. With reference to FIG. 5, an alternate embodiment of the control circuit 30 may measure this charge to develop a current proportional to the object's absolute velocity. The transducer 14, represented by capacitance $C_o$, is connected between ground and the inverting input of a first amplifier A1 which has its non-inverting input connected to ground. A feedback circuit consisting of a capacitance C1 and a resistance R1 is connected in parallel between the output of the amplifier A1 and its inverting input so that amplifier A1 operates as a charge amplifier. In order that the first amplifier A1 of FIG. 5 has essentially the same response as the amplifier A1 of FIG. 4, R1 in FIG. 5 may be equal to $R_{in} \cdot C_o / C_1$. The output of the first amplifier A1 is then fed through a resistor R into an integrator 60 which is the same as the identically numbered integrator in FIG. 4. The circuits of FIGS. 4 and 5 are therefore equivalent and differ only in having different gains in the ratio $C_1/C_o$.

In practice it is indeed possible to use the simple circuits of FIGS. 4 and 5. However, a more sophisticated circuit is desirable so that the control 30 is able to recover quickly from an overload condition. Two types of overload, static and dynamic, must be considered. A static overload occurs when the weight of the supported object is changed suddenly. This change in the steady-state condition produces a dc voltage at the output of the first amplifier A1 which decays only slowly through the time constant of the amplifier circuitry. In the meantime, the integrator 60 of the control circuit 30 is driven into saturation and recovery is extremely slow. Fast recovery can be achieved if $R_1$ (or $R_{in}$) is temporarily reduced during the overload condition to reduce the time constant. The output of the first amplifier A1 is then rapidly reduced to zero and the output of the integrator can be prevented from saturating. It is noted that reducing the time consant resistance by say a factor of 40 to enable a rapid recovery, raises the effective minimum frequency of the isolation device by a similar factor, in this case from 1 Hz to 40 Hz, for the period during which the resistance is reduced.

The second overload condition to be accounted for is dynamic overloading which occurs after a sudden and excessive mechanical shock either through the earth or directly into the supported mass. In this case the ability of the isolation elements to perform correction is exceeded and the mass of the object will oscillate at the mechanical resonant frequency of the support system. During alternate half-cycles, the integrator 60 will saturate positively then negatively whereas in between saturation, the oscillations will be damped by the isolation elements. Since no dc disturbance is present, the fastest recovery occurs under normal operation conditions. If R1 or ($R_{in}$) is reduced as for the static case, the oscillation is essentially undamped, due to the reduced low-frequency response, and recovery is considerably delayed.

Figure 6:
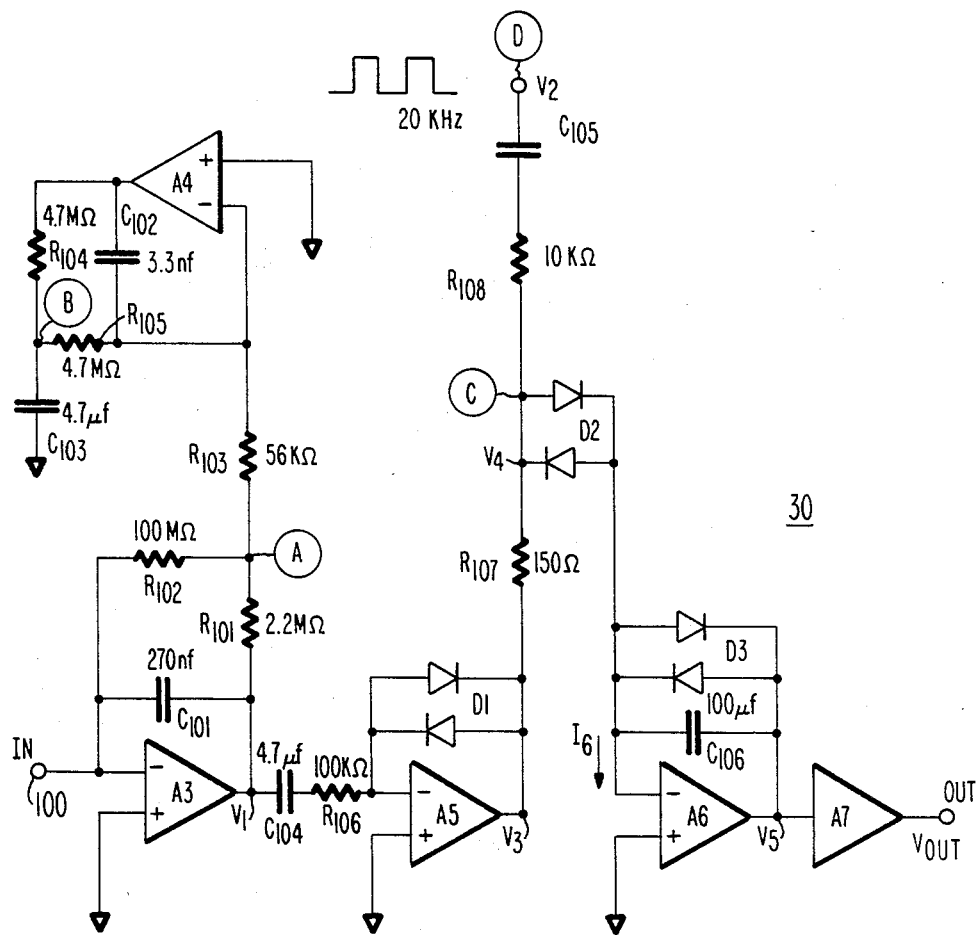

A practical solution for overload protection is provided by the control circuit 30 in FIG. 6 which has (1) a voltage control gain stage so that the control circuit for all of the isolation elements can be adjusted simultaneously and (2) an overload recovery ability for reducing the time constant resistance for static overloads but not for dynamic overloads.

The overload recovery circuitry is provided by amplifiers A3 and A4 and their related discreet components. Amplifier A3 has an input terminal 100 for connection to the vibration sensing transducer 14. The input terminal 100 is connected to the inverting input of amplifier A3 and the non-inverting input of the amplifier is connected directly to ground. Capacitor C101 is coupled across the output of amplifier A3 and its inverting input. Resistor R101 is connected between the output of amplifier A3 and node A. Resistor R102 is connected between node A and the inverting input of amplifier A3.

Resistor R103 couples node A to the inverting input of amplifier A4 which has its non-inverting input connected directly to ground. Capacitor C102 extends between the output of amplifier A4 and its inverting input. Resistor R104 connects the output of amplifier A4 to node B and resistor R105 connects node B with the inverting input of amplifier A4. Capacitance C103 extends between node B and ground. Amplifier A4 integrates the output of amplifier A3 and varies the feedback resistance of amplifier A3 as a function of the integration.

The output of amplifier A3 is coupled through capacitor C104 and resistor R106, connected in series, to the inverting input of amplifier A5 which is configured as a logarithmic amplifier. The non-inverting input of amplifier A5 is connected directly to ground. A pair of oppositely poled diodes D1 are connected in parallel between the output of amplifier A5 and its inverting input. Resistor R107 connects the output of amplifier A5 to node C. Node C in turn is connected to Node D by resistor R108 and capacitor C105 connected in series between the nodes.

Node C is connected to the inverting input of amplifier A6 by an oppositely poled pair of diodes D2 connected in parallel. The non-inverting input of amplifier A6 in connected directly to ground. Capacitor C106 is connected between the output of amplifier A6 and its inverting input. In addition, a third pair of oppositely poled parallelly connected diodes D3 extends across the output of amplifier A6 and its inverting input. The output of amplifier A6 is connected to the input of amplifier A7 which provides the output $V_{out}$ for the controller 30.

Amplifier A3 is a charge amplifier similar to amplifier A1 in FIG. 5 but now having a feedback resistance which may take on two different values thereby providing overload protection. First, if amplifier A4 which integrates the output of amplifier A3 is not driven into saturation, its feedback loop maintains the inverting input of A4 at ground potential. Resistors R101 and R103 then divide the output of amplifier A1 in the ratio:

$$\frac{R_{103}}{R_{101} + R_{103}}$$

This gives feedback path for amplifier A3 with an effective resistance of:

$$R_{eff} = R_{102} \cdot \frac{R_{101} + R_{103}}{R_{103}}$$

and having a time constant of $\tau_{non-sat} = R_{eff} \cdot C_{101}$.

In the second situation if amplifier A4 is driven into saturation, its inverting input floats more or less free and the effective feedback resistance for amplifier A3 is roughly equal to that of R102 in view of the relative values of R102 and R101. In this case the time constant is reduced such that $$\tau_{sat} = \tau_{non-sat} \cdot \frac{R_{103}}{R_{101} + R_{103}}$$

The component values (as shown in FIG. 6) for the integrator amplifier A4 are chosen such that for a typical dynamic overload the amplifier is not driven into saturation yet at the same time quickly saturates during a static overload.

With respect to the following description, the various voltages noted refer to the voltages between the specified point in the control circuit 30 and ground. The output voltage V1 of amplifier A3 feeds a current to the logarithmic amplifier A5 equal to V1 divided by R106. The logarithmic amplifier A5 provides an output voltage V3 such that:

$$V_3 = V_o \ln \frac{V_1}{i_o R_{106}}$$

where $V_o$ (approximately 25 mV) and $i_o$ are constants.

An external 20 KHz square wave signal having an setable amplitude V2 (from a source not shown) is applied to node D. This signal is added to V3 to give a voltage V4 at node C equal to V3+0.01 V2. This voltage, V4, across the diode pair D2 causes a current I6 to flow into the integrator A6 such that:

$$I_6 = \frac{V_1}{R_{106}} \cdot \exp \frac{0.01 \, V_2}{V_o}$$

Amplifier A6 integrates the current V1/R106 multiplied by a gain factor determined by the external voltage V2 applied at node D. Note that the integrator formed by amplifier A6 replaces the integrator 60 of FIG. 5. The stabilizing feedback resitor $R_{int}$ has now been replaced by the diode pair D3. This diode pair has high impedance for low output voltages V5 from the amplifier A6 but has decreasing impedance for increasing output voltage. This non-linear impedance helps the integrator to recover rapidly after large excursions, providing additional overload recovery to that already provided by amplifiers A3 and A4. The output voltage V5 is further amplified by the power amplifier A7 having a gain of about fifty, for example. This gives an output voltage for the controller 30 which is then applied to the electro-mechanical transducer 24.

One such control circuit 30 is used for each of the isolation elements in the anti-vibration system. The use of the 20 KHz reference voltage V2 applied to node D of each controller allows the gain of each control circuit to be simultaneously adjusted from a single source.

I claim:

1. A dynamic antivibration system, for reducing the effects of vibrations on an object, comprising:

a support structure having a curved surface for supporting the object;

means in contact with said support structure for resiliently supporting the support structure, said resilient support means comprising: three fixed supports; and a resilient frame extending from each of the fixed supports, said support structure being supported by said frame; and three means in contact with the support structure at separate contact points from said resilient support means, each of said three means comprising: means for sensing the vibration forces on the support structure at the contact point which provides an electrical output signal representing the degree of sensed vibrations, means for generating forces to counter the vibration forces, and a controller responsive to the sensed vibrations for controlling the means for generating forces.

2. The system as in claim 1 wherein the means for sensing the vibration forces includes a piezoelectric transducer.

3. The system as in claim 1 wherein the means for generating forces includes a solenoid.

4. The system as in claim 1 wherein the controller includes means for integrating the output signal of the vibration sensing means.

5. The system as in claim 1 wherein the controller includes:

an amplifier having an input connected to the means for sensing vibration forces, and having a feedback circuit such that the amount of feedback is a function of changes in the sensed vibration forces; and an integrator coupled to the output of the amplifier, the output of the integrator connected to the force generating means.

6. The system as in claim 5 wherein the feedback circuit of the amplifier includes a second integrator.

7. The system as in claim 1 wherein the resilient frame comprises metal straps fixed to and extending from the fixed supports to a central point, the support structure being positioned on the straps over the central point.

8. A system for reducing the effects of vibrations on an object, comprising:

three fixed supports, each of which is positioned substantially equidistant from the other two supports;

a resilent frame extending from the fixed supports;

an object support structure supported by the resilent frame and having a curved upper surface; and three vibration isolation elements for producing forces to counter the vibrations, each of said elements being between two different adjacent fixed supports and coupled to the support structure.

9. The system as in claim 8 wherein each isolation element comprises:

a force sensing transducer;

means for generating forces to counter the vibrations; and a controller responsive to the sensed vibrations for controlling the means for generating forces.

10. The system as in claim 9 wherein the controller includes:

an amplifier having an input connected to the force sensing transducer, and having a feedback circuit such that the amount of feedback is a function of changes in the sensed vibration forces; and an integrator coupled to the output of the amplifier, the output of the integrator connected to the force generating means.

* * * * *